United States Patent [19]

Liu

[11] Patent Number: 5,165,654

[45] Date of Patent: Nov. 24, 1992

[54] GAS CONTROL VALVE

[76] Inventor: Hsing-Fu Liu, No. 564-1, Tung Guan St., Tung Shyh Chen, Taichung Hsien, Taiwan

[21] Appl. No.: 757,828

[22] Filed: Sep. 11, 1991

[51] Int. Cl.$^5$ .................. F16K 31/528; F16K 47/08
[52] U.S. Cl. .................. 251/121; 251/205; 251/254; 251/263
[58] Field of Search .......... 251/121, 205, 251, 252, 251/253, 254, 263; 74/25, 57, 89, 99 A; 138/45, 46

[56] References Cited

U.S. PATENT DOCUMENTS

| | | | |
|---|---|---|---|
| 142,192 | 8/1873 | Bate | 251/254 |
| 955,531 | 4/1910 | Mueller | 251/121 |
| 1,234,096 | 7/1917 | Farrell | 251/253 |
| 1,964,835 | 7/1934 | Wheaton | 251/253 |
| 3,380,081 | 4/1968 | Eilertson et al. | 251/263 |
| 3,656,709 | 4/1972 | Shufflebarger et al. | 251/263 |
| 4,268,008 | 5/1981 | Barnum et al. | 251/121 |
| 4,616,805 | 10/1986 | Haas | 251/252 |

Primary Examiner—George L. Walton
Attorney, Agent, or Firm—Patterson & Keough

[57] ABSTRACT

A gas control valve including a body having a throat formed in a bore, a post slidably received in the bore and including a plug, a pin laterally engaged on an upper portion of the post, and a spring for biasing the post so that the plug can be separated from the throat and so that gas may flow through the throat, and a guide fixed in top of the bore and having two inclined surfaces, the ends of the pin are slidable along the inclined surfaces, the plug can engage with the throat when the knob is pushed toward the body so that gas is prevented from flowing through the throat.

4 Claims, 4 Drawing Sheets

GAS CONTROL VALVE

BACKGROUND OF THE INVENTION

1. Field of the Invention

The present invention relates to a valve, and more particularly to a gas control valve.

2. Description of the Prior Art

Generally, the gas furnace, the gas oven or the gas stove is directly coupled to the natural gas supplying source or to the gas container for supplying gas. As far as applicant is aware, no control valves were provided between the facilities and the gas supplying source.

The present invention has arisen to provide a gas control valve in order to control the flow of gas from the gas supplying source to the facilities.

SUMMARY OF THE INVENTION

The primary objective of the present invention is to provide a gas control valve for controlling the flow of gas from a gas reservoir to a facility.

In accordance with one aspect of the invention, there is provided a gas control valve including a body having a bore separated into two chambers by a throat, a post slidably received in an upper chamber and including a plug formed integral on a lower portion, a pin laterally engaged on an upper portion of the post, and a spring for biasing to move away from the lower chamber so that the plug can be separated from the throat and so that gas may flow from one chamber to the other via the throat, and a guide fitted in an upper portion of the upper chamber and including a pair of inclined surfaces, the ends of the pin being slidable along the inclined surfaces, and the plug can be engaged with the throat when the post is pushed inward of the body so that gas can be prevented from flowing through the throat.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
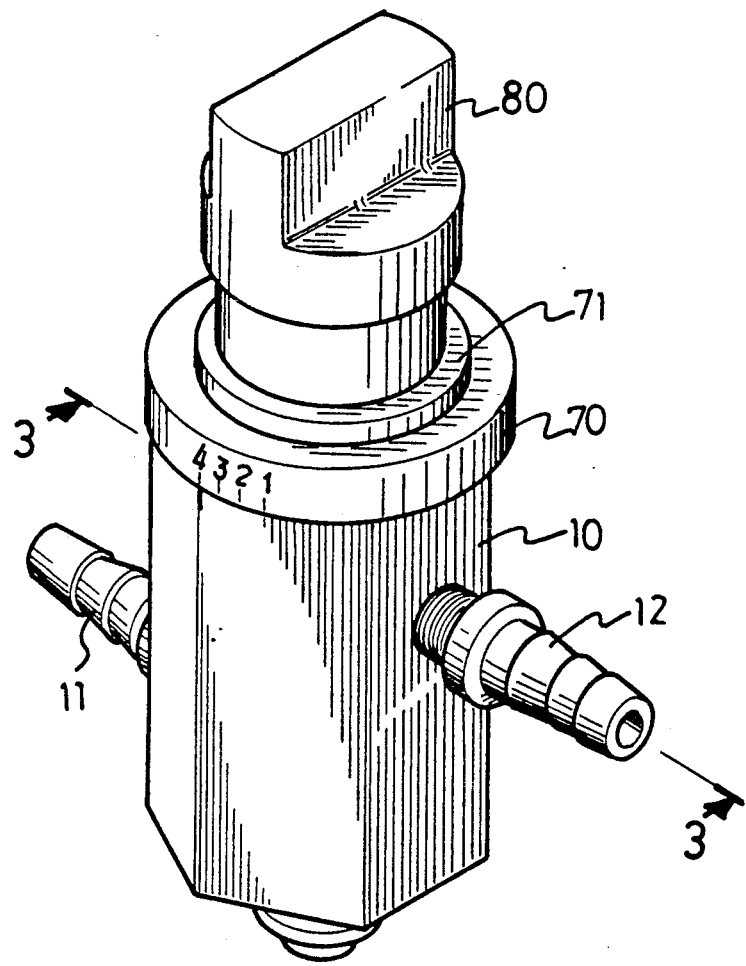
FIG. 1 is a perspective view of a gas control valve in accordance with the present invention.

Referring to the drawings and initially to FIG. 1, a gas control valve comprises a body 10 having an inlet pipe 11 and an outlet pipe 12 coupled to a gas reservoir and a facility (not shown), such as a gas stove, respectively so that gas can flow into the body 10 via the inlet pipe 11, and a knob 80 provided on top of the body 10 for operating the gas control valve.

Figure 2:
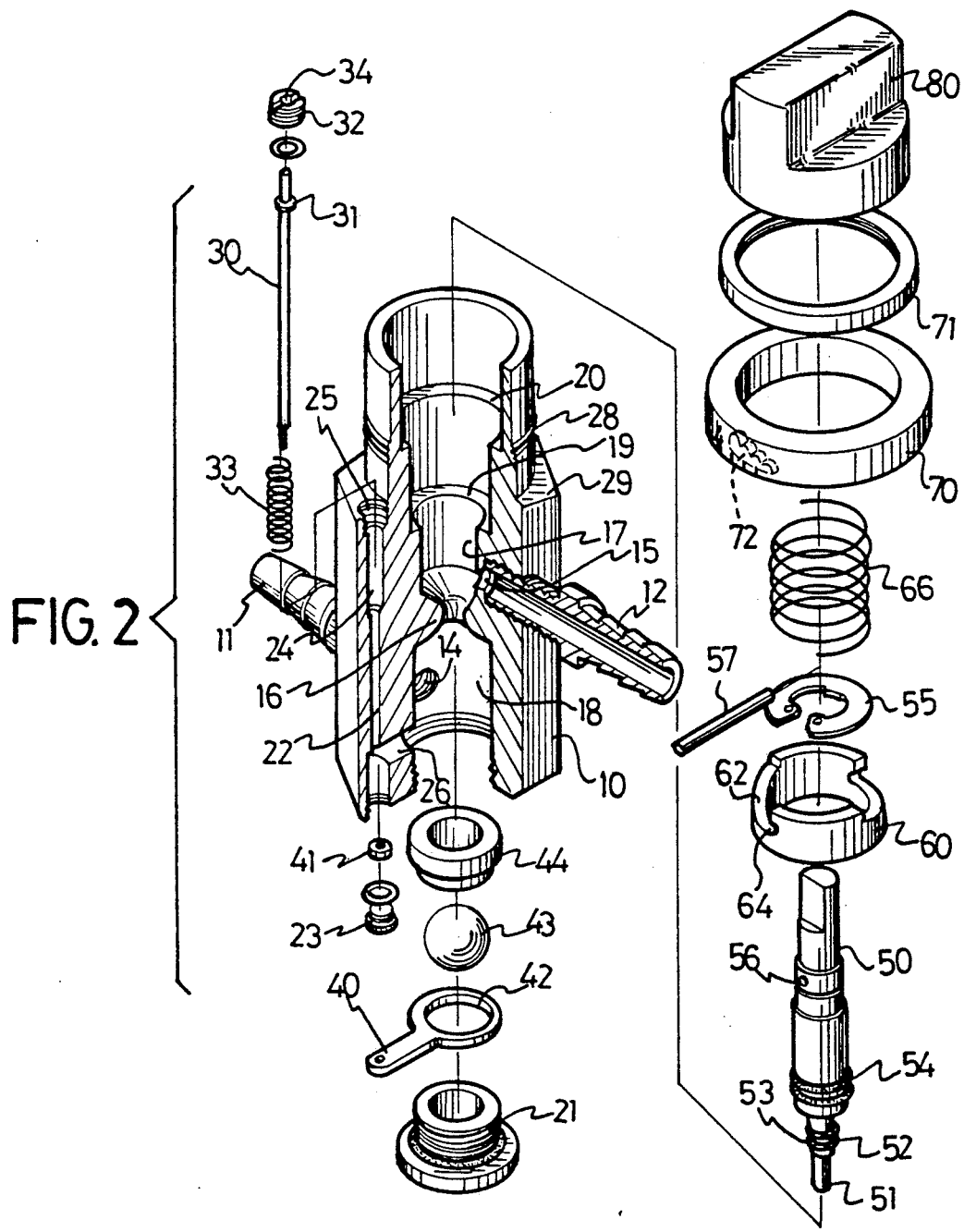
FIG. 2 is an exploded view of the gas control valve.
Figure 3:
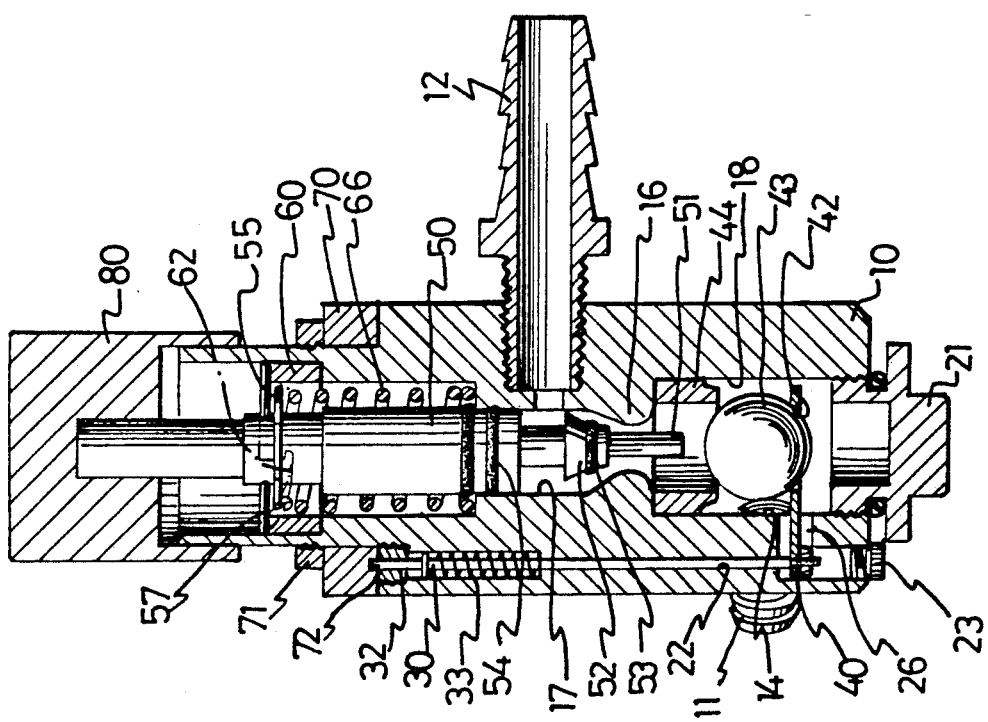

Referring next to FIGS. 2 and 3, the body 10 includes an inlet opening 14 and an outlet opening 15 to which the inlet pipe 11 and the outlet pipe 12 are engaged thereto, an annular flange 16 extended inward from the middle portion of the bore of the body 10 so as to form a throat portion in order to separate the bore of the body 10 into an upper chamber 17 and a lower chamber 18. The inlet opening 14 is communicated with the lower chamber 18 and the outlet opening 15 is communicated with the upper chamber 17. Two shoulders 19, 20 are formed in the upper portion of the upper chamber 17. The lower end of the lower chamber 18 is closed and sealed by a cap 21.

A passage 22 is longitudinally formed in the body 10 and is parallel to the bore of the body 10. The passage 22 has a lower end enclosed by a lock nut 23 and includes an enlarged space 24 and an inner thread 25 formed in the upper portion thereof. A hole 26 is laterally formed in the body 10 and is communicated between the passage 22 and the lower chamber 18 of the body 10. An outer thread 28 and a shoulder 29 are formed on the upper portion of the body 10. A rod 30 is slidably engaged in the passage 22 and includes a ring 31 formed integral on the upper end thereof and slidably engaged in the enlarged space 24. A lock nut 32 is threadedly engaged with the inner thread 25 for enclosing the upper end of the passage 22. A spring 33 is received in the enlarged space 24 and is engaged with the ring 31 so as to bias the rod 30 upward. The lock nut 32 includes an aperture 34 formed in the center thereof so that the upper end of the rod 30 can be biased to extend upward beyond the lock nut 32.

A support 40 has one end fixed to the lower end of the rod 30 by such as a nut 41 and has a ring 42 formed on the other end thereof and extended within the lower chamber 18 of the body 10. A ball 43 is received in the lower chamber 18 and can be supported on the ring 42 of the support 40 so that the ball 43 can be elevated and lower by the rod 30. A sleeve 44 which is preferably made of rubber materials is force-fitted in the upper portion of the lower chamber 18.

A post 50 is slidably received in the upper chamber 17 of the body 10 and includes a pole 51 of reduced diameter formed on the lower end thereof and extendible downward beyond the annular flange 16. A plug 52 is integrally formed on the middle portion of the pole 51 and has a sealing ring 53 engaged thereon and is engageable with the annular flange 16 of the body 10 for closing the passage between the lower chamber 18 and the upper chamber 17. Two sealing rings 54 are engaged on the lower end portion of the post 50 and are slidably engaged with the inner peripheral surface of the upper chamber 17. A retaining ring 55 is engaged on the upper portion of the post 50. The post 50 includes an orifice 56 laterally formed therein for receiving a pin 57. The knob 80 is engaged on top of the post 50.

A guide 60 is force-fitted on the shoulder 20 of the body 10 and includes a pair of inclined surfaces 62 formed on the upper portion thereof. A notch 64 is formed in the lower end of each of the inclined surfaces 62. Both ends of the pin 57 are slidably engaged on the inclined surfaces 62 so that the pin 57 can be guided to move up and down relative to the guide 60. The ends of the pin 57 are engageable within the notches 64 so that the post 50 can be maintained on the lowermost position relative to the guide 60. A spring 66 is engaged between the shoulder 19 and the retaining ring 55 for biasing the post 50 upward.

Figure 4:
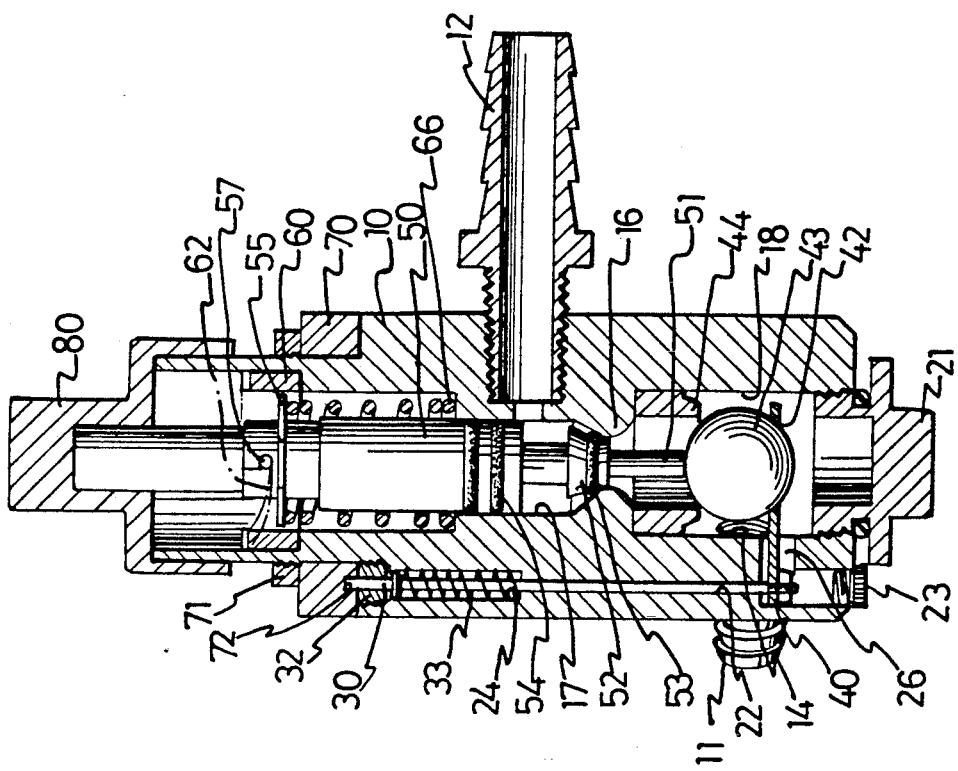
FIGS. 3, 4 and 5 are cross sectional views taken along lines 3—3 of FIG. 1.
Figure 5:
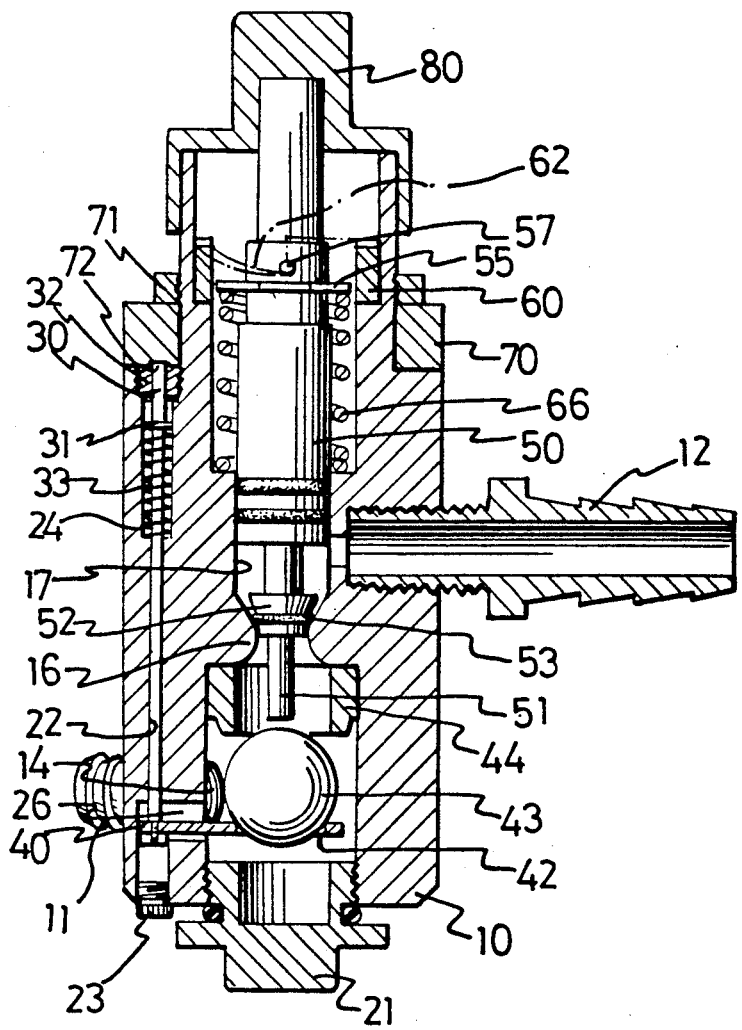

A barrel 70 is slidably engaged on the shoulder 29 of the body 10, and a ring 71 is threadedly engaged with the outer thread 28 of the body 10 so that the barrel 70 is limited to rotate relative to the body 10 and can not move up and down relative to the body 10. A staged ramp 72 is formed in the lower portion of the ring 71. The upper end of the rod 30 is slidably engageable with the ramp 72 so that the rod 30 can be caused to move up and down when the barrel 70 is rotated, and so that the ball 43 can be caused to move up and down (FIGS. 3 to 5). Therefore, the gap formed between the sleeve 44 and the ball 43 can be adjusted so that the flow of gas from the lower chamber 18 to the upper chamber 17 can be adjusted.

In operation, as shown in FIG. 3, the post 50 is biased upward by the spring 66 so that the plug 52 is not engaged with the annular flange 16 and so that gas may flow from the lower chamber 18 to the upper chamber 17 and may flow out of the outlet pipe 12. However, as shown in FIG. 4, when the knob 80 is pushed downward against the spring 66 and when the knob 80 is rotated, both ends of the pin 57 are caused to move downward along the inclined surfaces 62 so that the post 50 can be caused to move downward, the pin 57 is further rotated so that the ends thereof are engaged within the notches 64 and so that the pin 57 can be maintained in position. At this moment, the plug 52 is caused to engage with the annular flange 16 so that the passage for the gas is closed.

Accordingly, the gas control valve in accordance with the present invention can control the flow of gas from a gas reservoir to a facility. In addition, the flow volume of the gas can be adjusted.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A gas control valve comprising a body including a bore separated into a first chamber and a second chamber by a throat portion, an inlet opening and an in outlet opening formed in said body and communicated with said first chamber and said second chamber respectively so that gas flow into said first chamber of said body via said inlet opening may flow into said second chamber via said throat portion and may flow out of said outlet opening; a post slidably received in said second chamber of said body and including a plug formed integral on a lower portion thereof, a sealing ring slidably engaged with an inner surface of said second chamber, a knob provided on top thereof, a pin laterally engaged on an upper portion thereof, and means for biasing said post to move away from said first chamber so that said plug can be caused to move away from said throat portion and so that gas may flow from said first chamber into said second chamber via said throat portion; and a guide fitted in an upper portion of said second chamber and including a pair of inclined surfaces formed on top thereof, each of said inclined surfaces having a notch formed in one end thereof, said pin including two ends slidable along said inclined surfaces and engageable in said notches; and said plug can be caused to engage with said throat portion when said knob is pushed toward said body and is rotated and when said ends of said pin are caused to move along said inclined surfaces and are engaged in said notches of said guide, so that gas is prevented from flowing through said throat portion; a shoulder formed on an outer peripheral portion of said body, a passage formed in said body and having one end communicated with said shoulder, a rod slidably engaged in said passage and including a first end extendible outward beyond said shoulder of said body and a second end, means for biasing said rod so that said first end of said rod can be biased outward beyond said shoulder, a hole laterally formed in said body, a support received in said hole and engaged to said second end of said rod and including a ring extended in said first chamber of said body, a ball supported on said ring of said support, and a barrel rotatably engaged on said shoulder of said body and including a ramp formed therein, said first end of said rod being slidably engaged with said ramp so that said rod can be caused to move along said passage when said barrel is rotated and so that said support can be caused to move toward said throat portion and to move away from said throat portion, and so that a gap formed between said ball and said throat portion of said body can be adjusted in order to regulate the flow rate through said gas control valve.

2. A gas control valve according to claim 1, wherein a sleeve is engaged in said first chamber and is located close to said throat portion, said ball is movable relative to said sleeve and is engageable with said sleeve so that a gap formed between said ball and said sleeve can be adjusted.

3. A gas control valve according to claim 1, wherein said means for biasing said rod includes a second ring formed integral on said first end of said rod, and a spring engaged in said passage and engaged with said second ring so that said first end of said rod can be biased outward beyond said shoulder.

4. A gas control valve according to claim 1, wherein said ramp is a staged ramp.

* * * * *